United States Patent
Lin

(10) Patent No.: US 10,023,080 B2
(45) Date of Patent: Jul. 17, 2018

(54) ELECTRICAL FOLDABLE CAR SEAT

(71) Applicant: Shanghai Woyoo Electronic Technology Co., Ltd, Shanghai (CN)

(72) Inventor: Hao Lin, Shanghai (CN)

(73) Assignee: Shanghai Woyoo Electronic Technology Co., Ltd., Shanghai (CN)

( * ) Notice: Subject to any disclaimer, the term of this patent is extended or adjusted under 35 U.S.C. 154(b) by 106 days.

(21) Appl. No.: 15/122,593

(22) PCT Filed: May 19, 2016

(86) PCT No.: PCT/CN2016/082592
§ 371 (c)(1),
(2) Date: Aug. 30, 2016

(87) PCT Pub. No.: WO2017/166395
PCT Pub. Date: Oct. 5, 2017

(65) Prior Publication Data
US 2018/0111515 A1    Apr. 26, 2018

(30) Foreign Application Priority Data

Mar. 30, 2016 (CN) .......................... 2016 1 0194414

(51) Int. Cl.
*A47C 1/08* (2006.01)
*A47D 1/10* (2006.01)
(Continued)

(52) U.S. Cl.
CPC ............. *B60N 2/3009* (2013.01); *B60N 2/28* (2013.01); *B60N 2/68* (2013.01)

(58) Field of Classification Search
CPC .......... B60N 2002/2896; B60N 2/3009; B60N 2/28; B60N 2/68; B60N 2/00;
(Continued)

(56) References Cited

U.S. PATENT DOCUMENTS

| | | | |
|---|---|---|---|
| 6,568,755 B1 * | 5/2003 | Groening | B60N 2/2821 297/256.1 |
| 7,252,319 B2 * | 8/2007 | Toyota | B60N 2/062 296/65.09 |

(Continued)

FOREIGN PATENT DOCUMENTS

| | | | | |
|---|---|---|---|---|
| CN | 203920495 | * | 7/2014 | ............... B60N 2/30 |
| CN | 205059325 | * | 3/2016 | ............... B60N 2/28 |

OTHER PUBLICATIONS

Machine Translation of CN205059325 from Espacenet.com (Year: 2016).*

(Continued)

*Primary Examiner* — Mark R Wendell
(74) *Attorney, Agent, or Firm* — Wang Law Firm. Inc.

(57) ABSTRACT

An electrical foldable car seat includes a base frame having a driver securely mounted thereon, a sliding frame operably connected to the driver and slidably attached to the base frame and having an adapter securely attached to a free end of the sliding frame so that the base frame is able to move relative to the sliding frame due to power from the driver and a back frame foldably connected to the base frame and consisting of a pair of lower support frames foldably connected to free ends of the base frame through a first folding device and a pair of upper support frames foldably connected to free ends of the pair of lower support frames through a second folding device. The pair of lower support frames are able to be folded 90 degrees relative to the base frame.

9 Claims, 10 Drawing Sheets

(51) Int. Cl.
 *B60N 2/30* (2006.01)
 *B60N 2/28* (2006.01)
 *B60N 2/68* (2006.01)

(58) Field of Classification Search
 CPC ...... B60N 2/3004; B60N 2/3002; B60N 2/26; B60N 2/2821; B60N 2/2887
 USPC .......................................... 297/256.1, 250.1
 See application file for complete search history.

(56) References Cited

U.S. PATENT DOCUMENTS

| | | | | |
|---|---|---|---|---|
| 2004/0095005 A1* | 5/2004 | Dukes | ................. | B60N 2/0232 297/256.13 |
| 2005/0057066 A1* | 3/2005 | Blanger | ................. | B60N 2/12 296/65.13 |
| 2006/0255228 A1* | 11/2006 | Fischer | ................. | B60N 2/07 248/424 |
| 2008/0211279 A1* | 9/2008 | Pesach | ................. | B60N 2/062 297/256.12 |
| 2009/0167065 A1* | 7/2009 | Kespohl | ................ | B60N 2/2845 297/183.4 |
| 2010/0096896 A1* | 4/2010 | Nonomiya | ............ | B60N 2/22 297/362 |
| 2011/0272983 A1* | 11/2011 | Fritz | ................. | B60N 2/2806 297/250.1 |
| 2012/0161486 A1* | 6/2012 | Stojanovic | ............ | B60N 2/12 297/354.1 |
| 2012/0313415 A1* | 12/2012 | Nonomiya | ............ | B60N 2/68 297/354.1 |
| 2016/0059745 A1* | 3/2016 | Whitcombe | ......... | B60N 2/2812 297/217.4 |
| 2017/0080832 A1* | 3/2017 | Fujita | ................ | B60N 2/68 |
| 2017/0217336 A1* | 8/2017 | Wolf | ................... | B60N 2/062 |
| 2018/0009342 A1* | 1/2018 | Meng | .................. | B60N 2/42709 |

OTHER PUBLICATIONS

Machine Translation of CN203920495 from Espacenet.com (Year: 2014).*

* cited by examiner

ELECTRICAL FOLDABLE CAR SEAT

BACKGROUND OF THE INVENTION

The present invention relates to a foldable car seat and, more particularly, to a foldable car seat able to be completely folded when not in use.

Current commercially available child safety seat is targeted to infant or children under age who are legally regulated to put on a safety seat when boarding a vehicle. Normally, the safety seat is positioned at the backseat with the safety belt so that the user (children under age) is able to use it readily. However, due to the bulky design and massive volume the safety seat takes, there is not much room left for other use. Often in time, the driver needs to take it out of the vehicle to clear the backseat so that the driver is able to have room in the back to have extra load such as grocery and/or passengers and when the baby it about to be boarded on the vehicle, the driver will have to strap the safety seat back on again. The on-and-off of the safety seat is quite troublesome and tiresome even though there are all kinds of handy designs on the safety seat to facilitate the driver to carry it around.

In order to mitigate the shortcomings from the currently existing safety seat, it is an objective of the preferred embodiment of the present invention to provide a foldable and thus compact car seat so that there is no need to remove the car seat out of the vehicle when the presence of the car seat function inside the vehicle matters none.

BRIEF SUMMARY OF THE INVENTION

An objective of the present invention is to provide a foldable car seat which is compact when folded.

In order to accomplish the objective of being compact, there is provided with a base frame, a back frame, a first folding device sandwiched between the base frame and the back frame to allow the back frame to fold relative to the base frame and a second folding device sandwiched in between elements of the back frame so that when the back frame is not in use, the back frame is able to be further folded so that the overall volume is even more compact.

A further objective of the preferred embodiment of the present invention is that a driving device is provided to the base frame and a sliding frame is slidably connected to the base frame and operably connected to the driving device to allow the sliding frame to move relative to the base frame to accomplish the purpose of adjusting length of the base frame and providing a comfortable seating for the user.

It is an objective of the preferred embodiment of the present invention to provide a foldable car seat adapted to connect to vehicle seat. The foldable car seat includes a base frame having thereon a driver securely mounted thereon; a sliding frame operably connected to the driver and slidably attached to an inside of the base frame and having an adapter securely attached to a free end of the sliding frame to adapt to the vehicle seat so that the base frame is able to move relative to the sliding frame due to power from the driver; and a back frame foldably connected to the base frame and consisting of a pair of lower support frames foldably connected to free ends of the base frame through a first folding device and a pair of upper support frames foldably connected to free ends of the pair of lower support frames through a second folding device to allow the pair of lower support frames to fold relative to the base frame and the pair of upper support frames to fold relative to the pair of lower support frames.

It is an objective of the preferred embodiment of the present invention to provide a foldable car seat, wherein the sliding frame has a first slider slidably attached to an inside of the base frame, a second slider oppositely located relative to the first slider and slidably attached to the inside of the base frame and a connection rod securely connected to the first slider and the second slider and having the driver securely attached thereto such that the connection rod, the first slider and the second slider are moved relative to the base frame due to the driver.

It is an objective of the preferred embodiment of the present invention to provide a foldable car seat, wherein a pad frame is sandwiched between the first slider and the base frame and between the second slider and the base frame and has a flange formed thereon to avoid excessive friction therebetween.

It is an objective of the preferred embodiment of the present invention to provide a foldable car seat, wherein the base frame includes a first side plate, a second side plate oppositely located relative to the first side plate and a connection rod sandwiched between the first side plate and the second side plate to fix locations of the first side plate and the second side plate, a bore is defined through the side face of the first side plate and of the second side plate to movably accommodate therein at least a stop which is firmly attached to a side face of the first slider and of the second slider so that extent of the movement of each of the first slider and of the second slider is limited.

It is still an objective of the preferred embodiment of the present invention to provide a foldable car seat, wherein the back frame includes a first support frame foldably connected to distal end of the first side plate and a second support frame oppositely located relative to the first support frame and foldably connected to distal end of the second side plate, the first folding device is sandwiched between the first support frame and the distal end of the first side plate and between the second support frame and the distal end of the second side plate so that both the first support fame and the second support frame are able to fold simultaneously relative to the base frame due to the connection rod.

It is another objective of the preferred embodiment of the present invention to provide a foldable car seat, wherein the first folding device includes a first adjusting plate securely attached to the first side plate, a second adjusting plate securely attached to the first support frame, a motor securely attached to an inner side of the first support frame to drive the second adjusting plate to pivot relative to the first adjusting plate so that the first support frame is foldable relative to the first side plate.

It is an objective of the preferred embodiment of the present invention to provide a foldable car seat having a driving rod firmly connecting the first support frame to the second support frame to allow the first support frame along with the second support frame to pivot relative to the base frame.

It is an objective of the preferred embodiment of the present invention to provide a foldable car seat having a third support frame foldably connected to the first support frame and a fourth support frame foldably connected to the second support frame, wherein the second folding device is sandwiched between the first support frame and the third support frame and between the second support frame and the fourth support frame to respectively allow the third support frame to fold relative to the first support frame and the fourth support frame to fold relative to the second frame.

It is an objective of the preferred embodiment of the present invention to provide a foldable car seat, wherein the third support frame and the fourth support frame are selectively positioned between a first position where the third support frame and the fourth support frame are parallel relative to the first support frame and the second support frame and a second position where the third support frame and the fourth support frame are vertical relative to the first support frame and the second support frame.

It is an objective of the preferred embodiment of the present invention to provide a foldable car seat, wherein the second folding device includes a joint respectively inserted between the first support frame and the third support frame and between the second support frame and the fourth support frame to allow the third support frame to pivot relative to the first support frame and to allow the fourth support frame to pivot relative to the second support frame and a first spring having a first end securely rested in a free end of the joint and a second end securely attached to a side face of the first support frame so that when the third support frame and the fourth support frame are parallel relative to the first support frame and the second support frame, the first spring is tension free and when the third support frame and the fourth support frame are vertical relative to the first support frame and the second support frame, the first spring is tensioned.

It is an objective of the preferred embodiment of the present invention to provide a foldable car seat, wherein the second folding device further has a first cutout defined in a top periphery of the first support frame and of the second support frame and a second cutout defined in a side periphery of the first support frame and of the second support frame and a limit selectively located in the first cutout and the second cutout to respectively position the third support frame as well as the fourth support frame to be parallel or vertical relative to the first support frame and the second support frame.

It is an objective of the preferred embodiment of the present invention to provide a foldable car seat, wherein the second folding device further comprises a second spring having a first end securely respectively attached to an inner side face of the third support frame and of the fourth support frame and a second end securely attached to the limit to allow the limit to be retracted after the limit is moved.

The present invention will be further described in connection with the accompanying drawings and specific embodiments.

DETAILED DESCRIPTION OF THE INVENTION

The present invention will be described further in connection with the accompanying drawings and specific embodiment(s).

Figure 1:
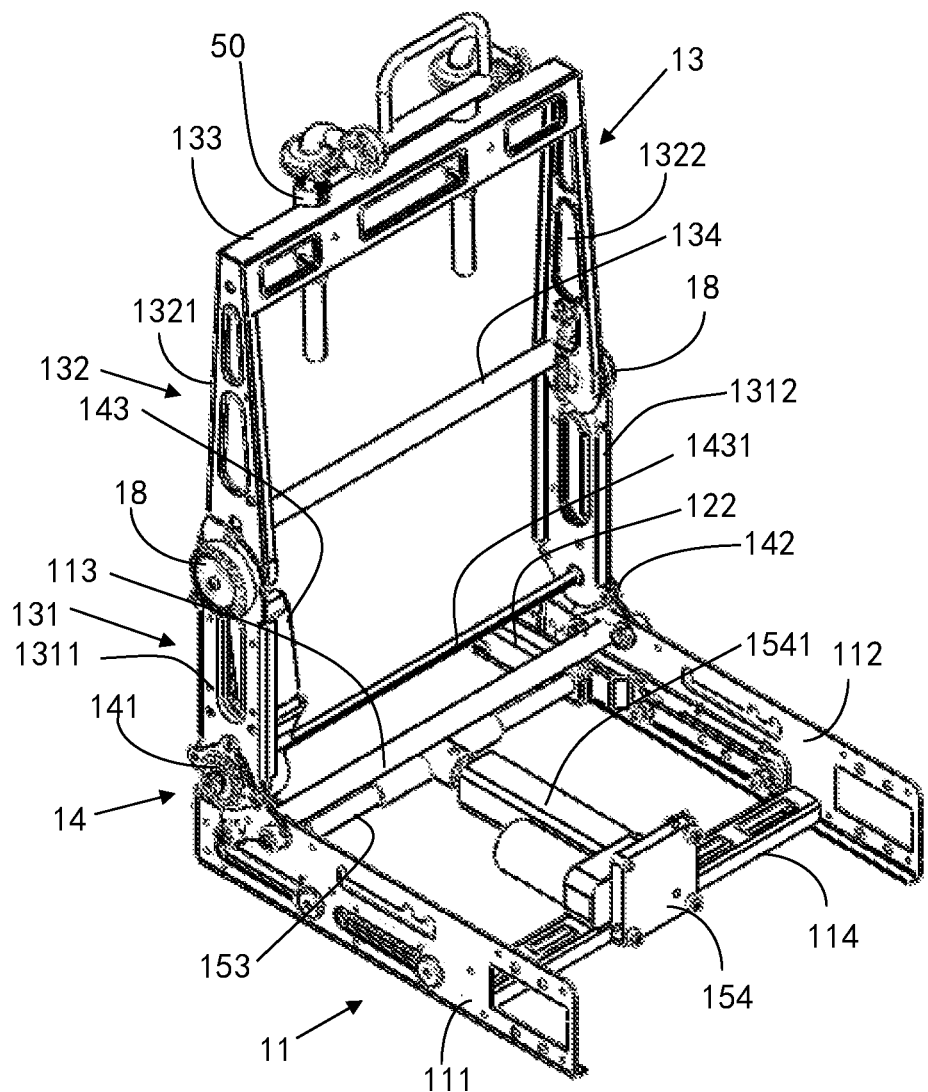
FIG. 1 is a perspective view showing a preferred embodiment of the present invention.
Figure 2:
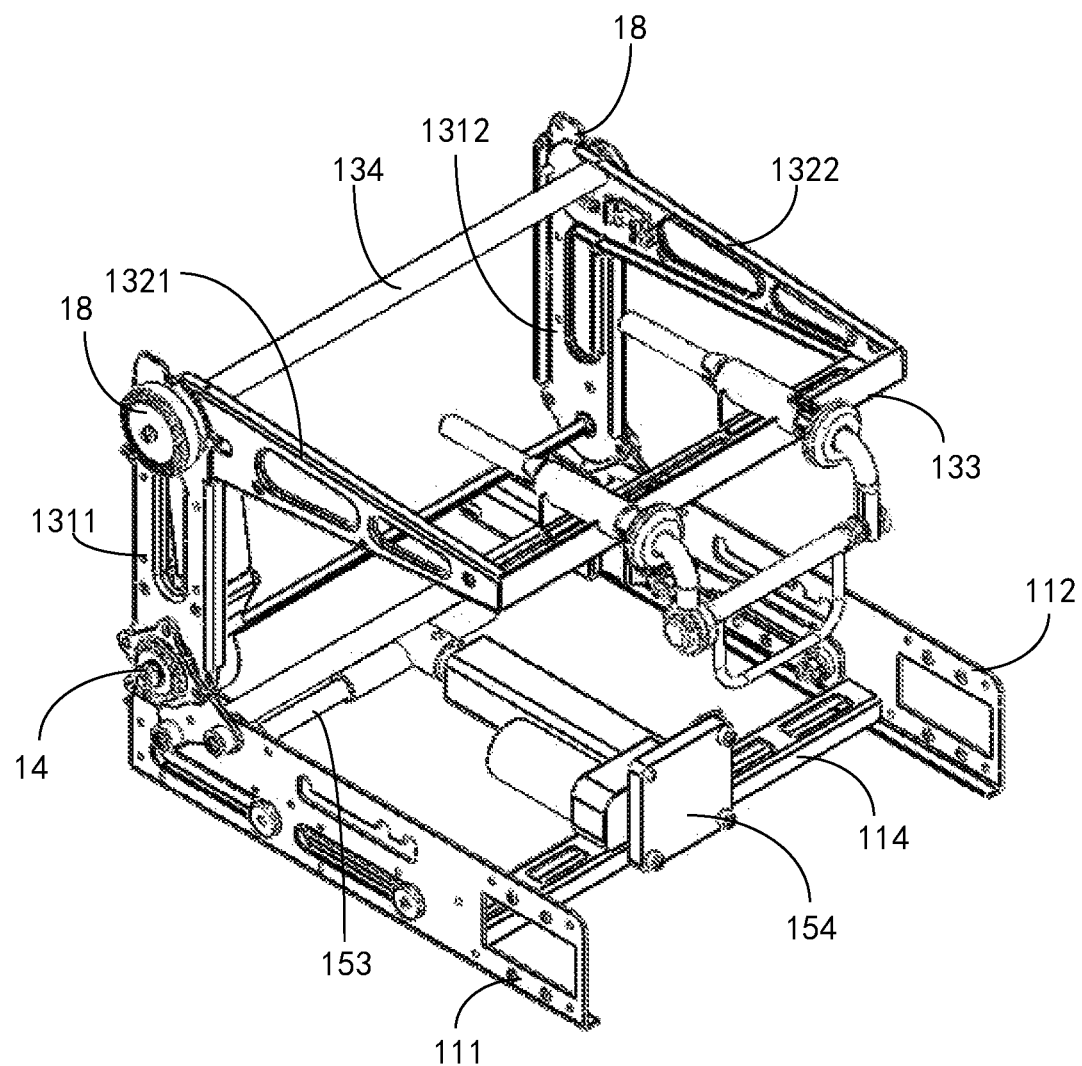
FIG. 2 is still a perspective view of the preferred embodiment of the present invention where the second support frame is folded relative to the first support frame of the back frame.

With reference to FIGS. 1 and 2, it is to be noted that the foldable car seat constructed in accordance with the present invention includes a base frame 11 and a back frame 13 foldable relative to the base frame 11 with the assistance of a first folding device 14 which is sandwiched between the base frame 11 and bottom of the back frame 13. The base frame 11 has a first side plate 111, a second side plate 112 oppositely and horizontally located relative to the first side plate 111 and a first connection rod 113 securely connected to a distal end of both the first side plate 111 and the second side plate 112 to respectively secure relative locations of the first side plate 111 and the second side plate 112. Still, a support frame 114 is securely provided between the first side plate 111 and the second side plate 112 to support thereon a driver 154. Preferably, the driver 154 may be hydraulically or electrically activated piston. The back frame 13 is composed of a first support 131 foldably connected to a distal end of the base frame 11 and a second support 132 foldably connected to a distal end of the first support 131. The first support 131 consists of a pair of oppositely located first support frames 1311 and the second support 132 consists of a pair of oppositely located second support frames 1312. Preferably, the first side plate 111 is made of a steel or iron having a bending stress larger than 200 Mpa, or a nylon material with or larger than 25% fiber glass, or Polyamide (PA)+Acrylonitrile Butadiene Styrene (ABS) compound material, or a carbonated fiber material or an alloy of aluminum and magnesium, or a titanium alloy or a magnesium alloy.

Figure 3:
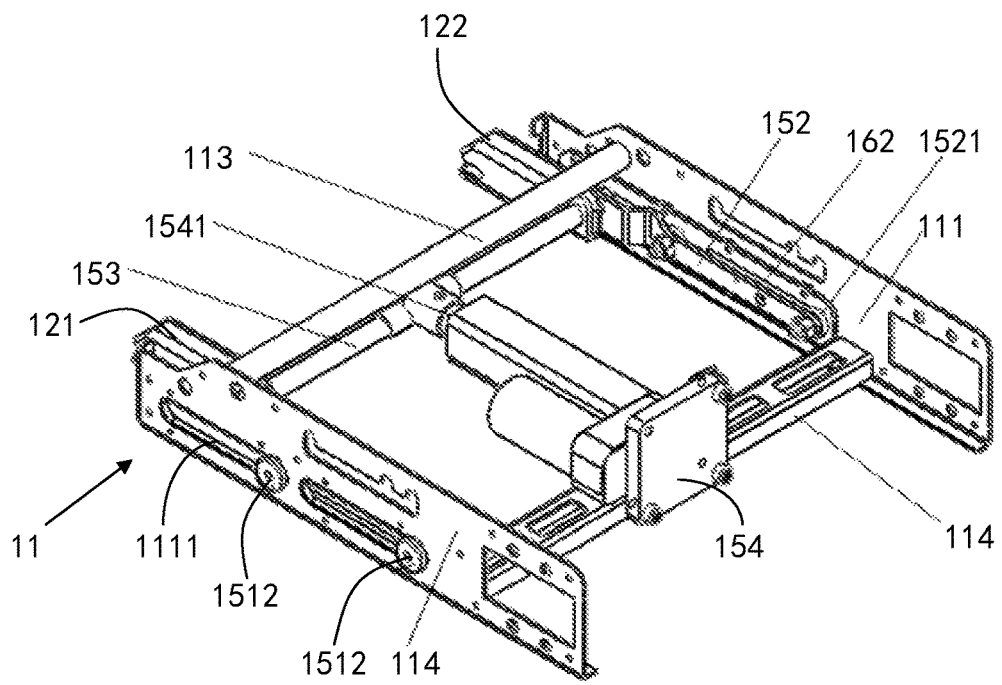
FIG. 3 shows a perspective view of the base frame together with the sliding frame.
Figure 4:
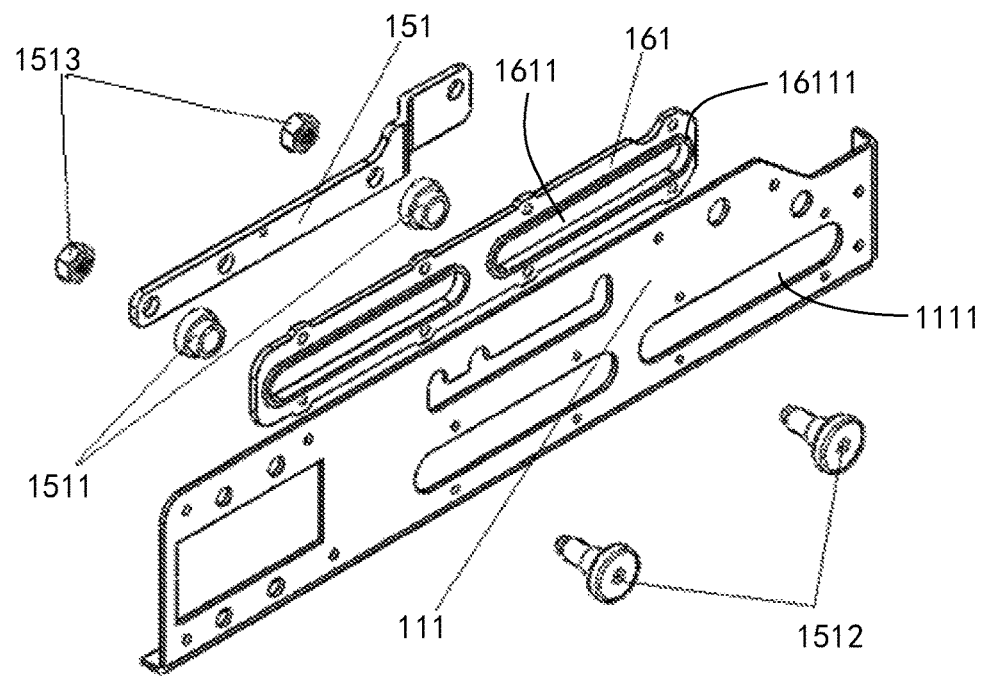
FIG. 4 is an exploded perspective view showing how a portion of the base frame is connected to a portion of the sliding frame.
Figure 5:
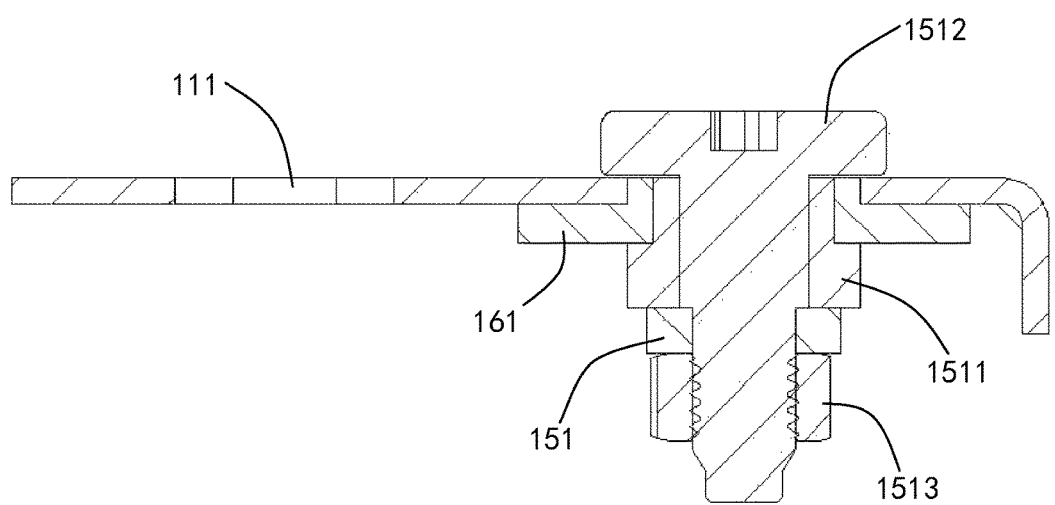
FIG. 5 is a cross sectional view showing the relationship between the base frame and the sliding frame, wherein a padding frame is sandwiched between the sliding frame and the base frame.

With reference to FIGS. 3, 4 and 5, a sliding frame 15 is provided inside the base frame 11 and has a first slider 151 slidably connected to an inside of the first side plate 111 and a second slider 152 slidably connected to an inside of the second side plate 112. Both the first slider 151 and the second slider 152 are, preferably, elongate in shape and have substantially the same structure. Thus, for brevity, the following description will focus on the detailed structure of the first slider 151 as well as the relationship between the first slider 151 and the first side plate 111 of the base frame 11. It is appreciated that the first side plate 111 defines there through first bores 1111, preferably elongated in shape. The first slider 151 includes a body, a pair of first stops 1511 securely mounted on or attached to a side face of the body and respectively having a centrally defined through hole (not numbered), a pair of bolts 1512 extendable through the first bores 1111 of the first side plate 111 of the base frame 11 and a pair of nuts 1513 securely and threadingly attached to the bolts 1512 after the pair of bolts 1512 are extended through the first bores 1111, the centrally defined through hole of the first stops 1511 and the body. It is understandable that even the bolts 1512 are securely and threadingly attached to the nuts 1513, the first slider 151 is still able to slide relative to the first side plate 111 with the assistance of the pair of first stops 1511 as well as the bolts 1512 within the first bores 1111 to limit extent of movement of the first slider 151 relative to the first side plate 111.

In order to avoid excessive friction between the first slider 151 and the inside of the first side plate 111, a pad frame 161 is sandwiched between the first side plate 111 and the first slider 151. The pad frame 161 has a pair of first through holes 1611 defined there through to structurally correspond that of the first bores 1111 of the first side plate 111 to allow extension of the pair of bolts 1512 and a flange 1611 circumferential formed around a periphery defining each of the first through holes 1611 so that after the pad frame 161 is sandwiched between the first slider 151 and the first side plate 111, the friction between the first slider 151 and the first side plate 111 is greatly reduced. From the drawings as shown, it is noted that a second slider 152 is provided to an inside of the second side plate 112 and with the help of second stops 1521, extent of the sliding movement of the second slider 152 relative to the second side plate 112 is limited.

It is further noted especially from FIG. 3 that after the sliding frame 15 is provided to the base frame 11, a second connection rod 153 is provided to firmly connect to distal ends of both of the first slider 151 and the second slider 152 so that both the first slider 151 and the second slider 152 are able to move simultaneously. Still, a push rod 1541 a free end of which is extendable from the driver 152 and securely connected to the second connection rod 153 such that the sliding frame 15 is able to move based on the extension of the push rod 1541.

Figure 6:
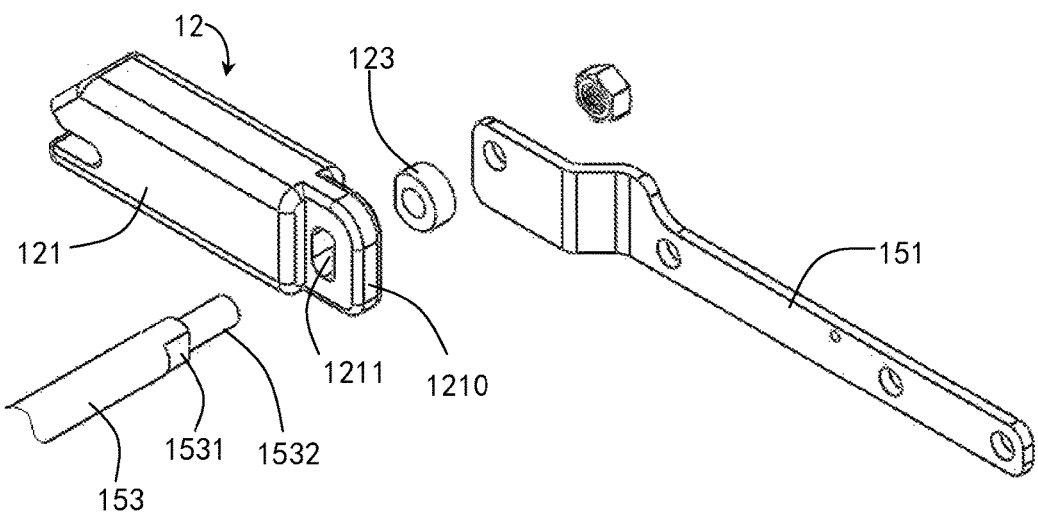
FIG. 6 presents an exploded perspective view showing how the sliding frame is connected to the second connection.

With reference to FIG. 6 and still taking FIG. 1 for reference, an adapter 12 is provided to the sliding frame 15. The adapter 12 includes a first adapting rod 121 securely connected to the first slider 151 and a second adapting rod 152 securely connected to the second slider 152. In order to accomplish the secure engagement between the first adapting rod 121 and the first slider 151 as well as that of the second adapting rod 122 and the second slider 152, each distal end of the second connection rod 153 has a circumferential cutout 1531 and an extension 1532, preferably a threaded extension, integrally extended from the distal free end of the circumferential cutout 1531. In order to be brief and avoid any possible description repetition, it is still using the first adapting rod 121 for example. A distal free end of the first adapting rod 121 has a connection plate 1210 integrally formed and extended out there from. The connection plate 1210 has a hole 1211 defined through the connection plate 1210 and structurally adapted to the shape of the circumferential cutout 1531 of the second connection rod 153 so that after the extension 1532 of the second connection rod 153 extends through a portion of the first slider 151 and the hole 1211 of the first adapting rod 121, the circumferential cutout 1531 is snugly fitted inside the hole 1211 of the first adapting rod 121 and thus after a nut is used to secure engagement between the second adapting rod 121 and the second connection rod 153, the adapter 12 is able to move while the second connection rod 153 is moved by the power of the push rod 1541 of the driver 154. As understood that one distal end of the adapter 12 is securely connected to the second connection rod 153, the other distal end of the adapter 12 is then accustomed to make a connection to the seat originally provided to the vehicle. Thereafter, it is understood that with the power of the driver 154 and the relationship between the push rod 1541 and the adapter 12, the base frame 11 is able to move relative to the car seat to accomplish the purpose of adjusting the foldable car seat relative to the vehicle seat.

Figure 7:
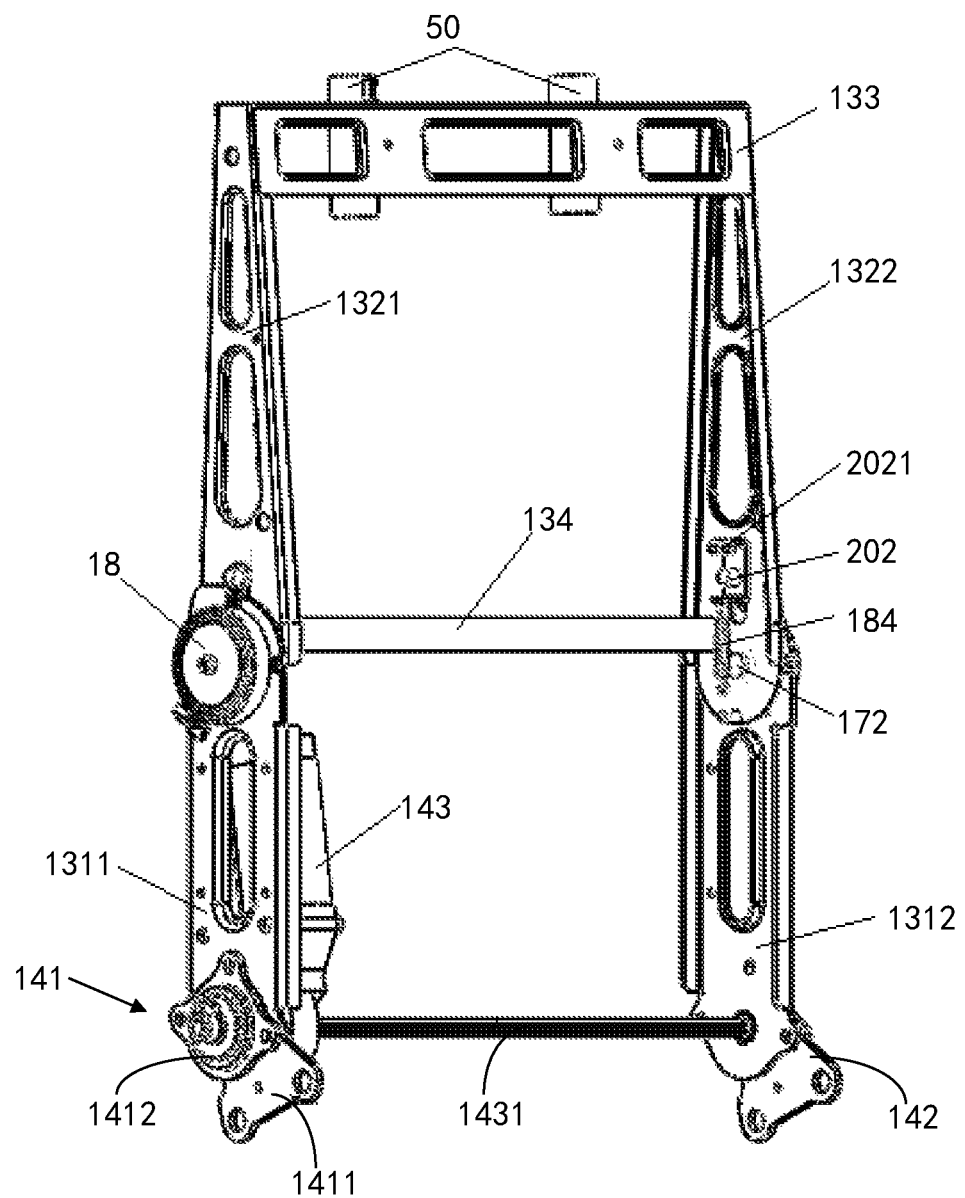
FIG. 7 is a schematic structural view showing the first folding device and the second folding device are provided to the back frame to respectively enable the first support frame to fold relative to the base frame and the second support frame to fold relative to the first support frame.
Figure 8:
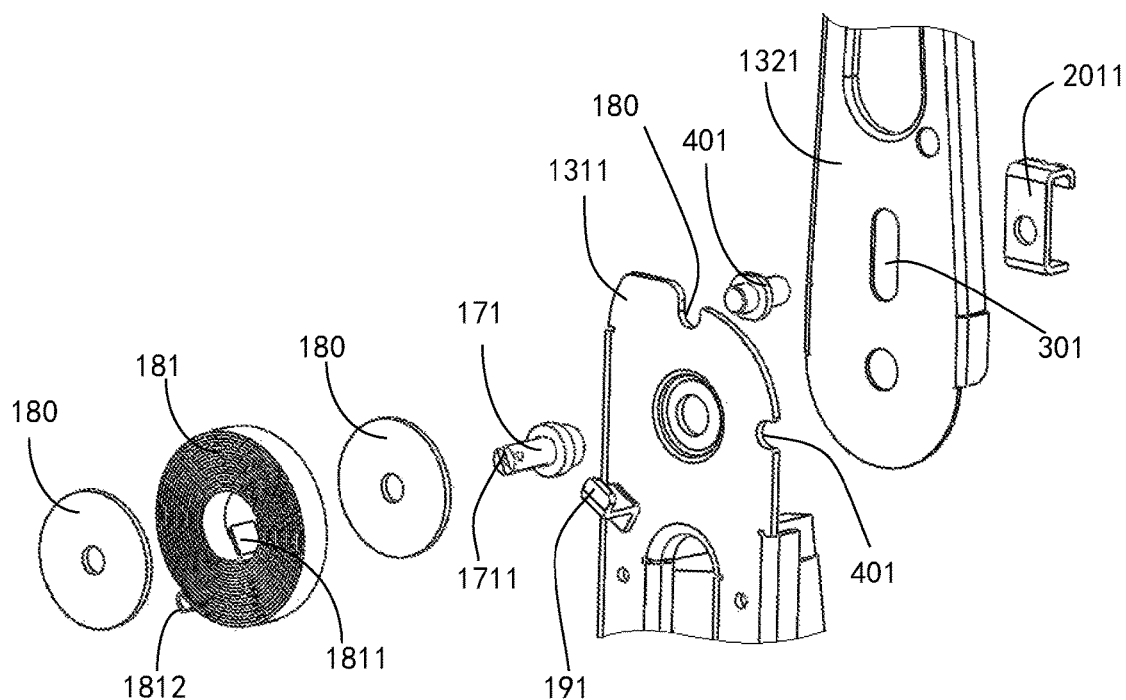
FIG. 8 is an exploded perspective view showing elements of the second folding device and relationship with the back frame.

With reference to FIG. 7 and still using FIG. 1 for reference, it is noted that a first folding device 14 is provided to both the base frame 11 and the back frame 13 and has a first adjuster 141 sandwiched between the first side plate 111 and a first support frame 1311 a second adjuster 142 sandwiched between the second support frame 1312 and the second side plate 112. Still, for brevity and to avoid any misunderstanding resulted from description repetition, only the first adjuster 141 is described and the second adjuster 142 will not be described as fully as that of the first adjuster 141. The first adjuster 141 is composed of a first adjusting plate 1411 securely attached to a side face of the first side plate 111 and a second adjusting plate 1412 securely attached to a side face of the first support frame 1311. A motor 143, preferably a step motor, is securely attached to an inner side face of the first support frame 1311 and has a driving rod 1431 firmly connecting an inner side face of each of the second adjusting plate 1412 of the first adjuster 141 and of the second adjuster 142 to drive the second adjusting plate 1412 of the first adjuster 141 and the second adjusting plate of the second adjuster 142 to rotate relative to the first adjusting plate 1411 of the first adjuster 141 and the first adjusting plate of the second adjuster 142 so that both of the first support frame 1311 and the second support frame 1312 are able to fold (rotate or pivot or any equivalent movement) relative to the first side plate 111 and the second side plate 112 of the base frame 11. Due to the rotational feature of both the first support frame 1311 and the second support frame 1312 relative to the base frame 11, it is understood that the back frame 13 is foldable relative to the base 11. As can be understood that the first adjusting plate 1411 may be provided with a planetary gear (not numbered) and the second adjusting plate 1412 may be provided with a sun gear (not numbered) mated with the planetary gear of the first adjusting plate 1411 such that when the motor 143 is powered to drive the driving rod 1431 to rotate, which produces the driving power to the second adjusting plate 1412 as well as the sun gear. As result, the back frame 13 is folded as required.

With reference to FIGS. 8 to 12 and still taking FIG. 1 as reference, as described earlier, there is provided with a second folding device 18 between the first support 131 and the second support 132. To be more precise, the second folding device 18 is sandwiched between the first support frame 1311 and the third support frame 1321 and between the second support frame 1312 and the forth support frame 1322. Here, to avoid any possible confusing and misunderstanding resulted from description repetition, only the second folding device 18 attached between the first support frame 1311 and the third support frame 1321 is described.

The second folding device 18 includes a first cutout 401 defined in a top periphery of the first support frame 1311, a second cutout 402 defined in a side periphery of the first support frame 1311 and a positioning stop 191 formed on a side face of the first support frame 1311. Furthermore, it is to be noted that the second folding device 18 also has a first joint 171 (a second joint 172 is shown especially in FIG. 7 and functions the same as that of the first joint 171) extending through the first support frame 1311 and into the third support frame 1321 to allow the third support frame 1321 to pivot relative to the first support frame 1311 and having a slit 1711 defined in a distal end thereof and a first spring 181, preferably a coil spring, having a first end 1811 securely rested in the slit 1711 and a second end 1812 securely rested on the positioning stop 191. In order to protect the user from being hurt by the first spring 181, a cap 180 is provided to cover or enclose the entire first spring 181. From the accompanying drawings, it is appreciated that the first spring 181 of the second folding device 18 is provided on the outside of the first support frame 1311. Opposite to the location of the first spring 181, a second spring 182 (184 is provided between the second support frame 1312 and the fourth support frame 1322), preferably a leaf spring, is provided on the inside of the first support frame 1311 and has a first end securely attached to an inner side face of the first support frame 1311 and a second end provided with a limit 201 (a second limit 202 is provided to the second spring 184 between the second support frame 1312 and the fourth support frame 1322) formed thereon. To accommodate the limit 201, a limit hole 301 is defined through a side face of the third support frame 1321 so that the limit 201 is able to slide within the limit hole 301.

Figure 9:
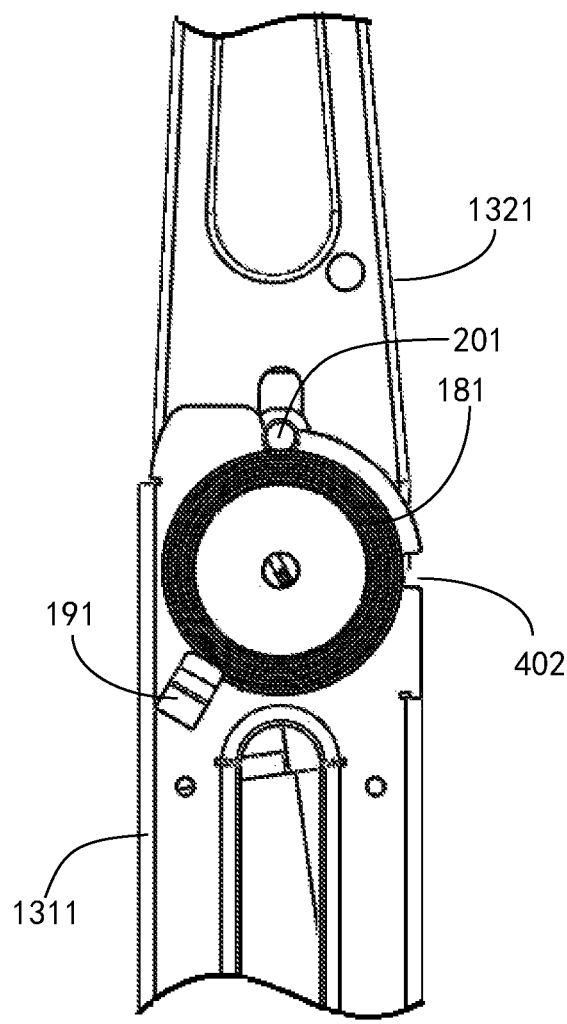
FIG. 9 is a schematic side plan view indicating how the second folding device is mounted onto the back frame.
Figure 10:
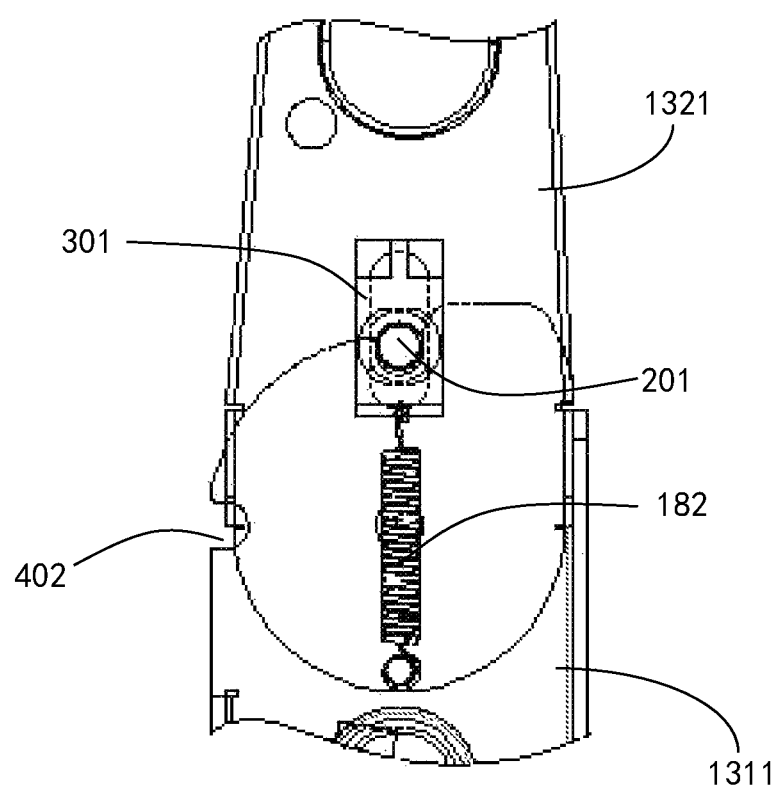
FIG. 10 is a schematic side plan view showing a leaf spring is provided to an inner side of the back frame.
Figure 11:
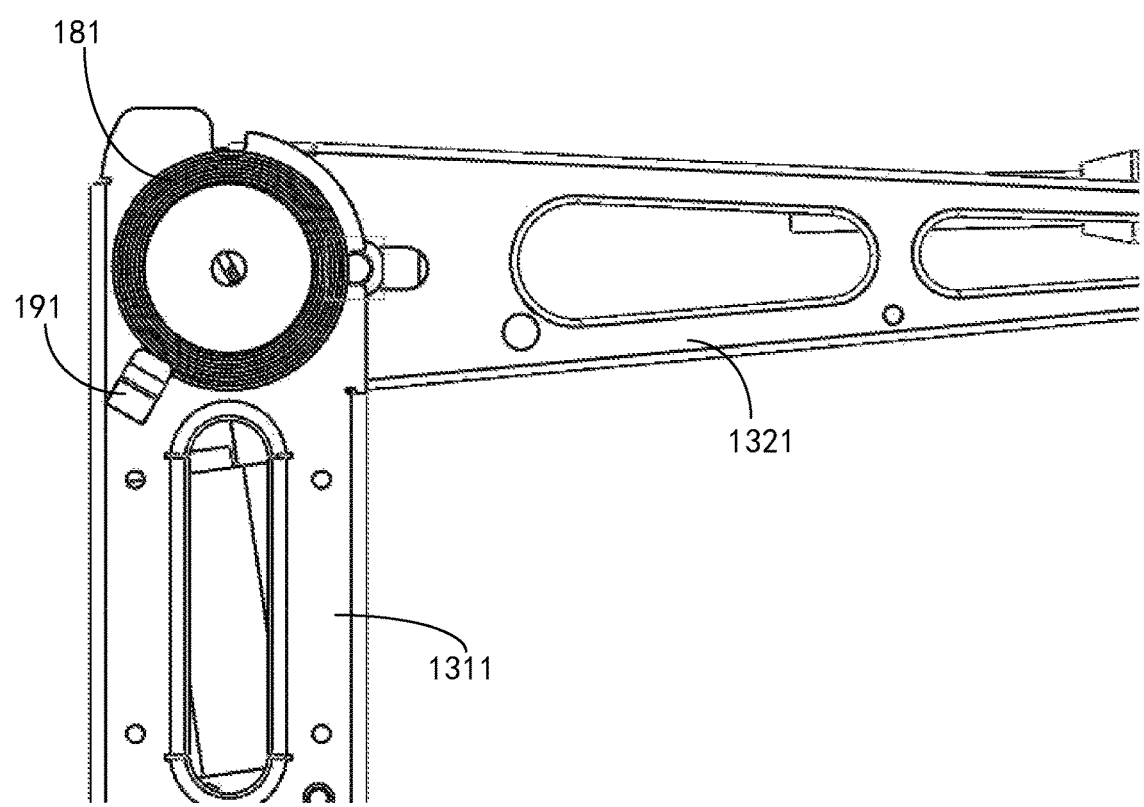
FIG. 11 is a schematic side plan view showing how the second folding device operates when the second support frame is folded relative to the first support frame.
Figure 12:
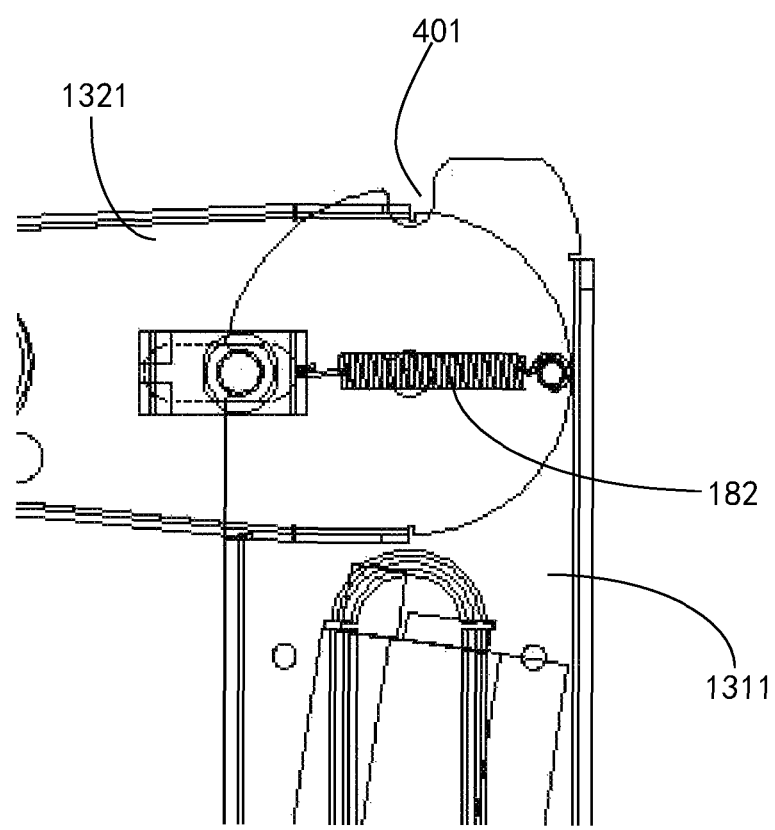
FIG. 12 is a schematic side plan view showing how the leaf spring operates when the second support frame is folded relative to the first support frame.

Taking FIGS. 9 and 10 for reference, it is noted that when the first support frame 1311 and the third support frame 1321 is parallel relative to each other, the first spring 181 is tension free with the second end securely rested on the positioning stop 191 and the limit 201 inside the limit hole 301 rested inside the first cutout 401, a first position. However, before the third support frame 1321 is folded relative to the first support frame 1311 and an angle of 90 degree(s) between the third support frame 1321 and the first support frame 1311 is expected, the limit 201 is lifted away from the first cutout 401 to allow the third support frame 1321 to pivot relative to the first support frame 1311. When the angle of 90 degree(s) exists between the first support frame 1311 and the third support frame 1321 is reached, it is observed that the limit 201 is now shifted to the second cutout 402. After the limit 201 is securely rested inside the second cutout 402 due to the tension from the second spring 182, relative position of the third support frame 1321 to the first support frame 1311 is fixed and the folded car seat is shown in FIG. 2. In order to readily facilitate movement of the limit 201, a lifter 2011 may be provided to the limit 201. The lifter 2011 may be integrally formed on the limit 201 or may be detachably yet firmly connected to the limit 201. The technique involved to form the lifter 2011 on the limit 201 or to detachably yet firmly connect the lifter 2011 to the limit 201 is well known in the art and no detailed description thereof is provided for clarity and concise.

To increase comfort, a pillow mount 50 is provided on top of the foldable car seat and has a top beam 133 mounted on free ends of both the third support frame 1321 and the fourth support frame 1322 and a lower beam 134 mounted at a middle portion of both the third support frame 1321 and the fourth support frame 1322.

Although the invention has been described in connection with the embodiments shown in the accompanying drawings, a person having ordinary skill in the art can make various modifications to the invention based on the above descriptions. Therefore, some details of the embodiment should not be construed to restrict the invention. The scope of the invention is limited by the accompanying claims.

What is claimed is:

1. A foldable car seat adapted to connect to vehicle seat, the foldable car seat comprising:
    a base frame having thereon a driver securely mounted thereon;
    a sliding frame operably connected to the driver and slidably attached to an inside of the base frame and having an adapter securely attached to a free end of the sliding frame to adapt to the vehicle seat so that the base frame is able to move relative to the sliding frame due to power from the driver; and
    a back frame foldably connected to the base frame and consisting of a pair of lower support frames foldably connected to free ends of the base frame through a first folding device and a pair of upper support frames foldably connected to free ends of the pair of lower support frames through a second folding device to allow the pair of lower support frames to fold relative to the base frame and the pair of upper support frames to fold relative to the pair of lower support frames.

2. The foldable car seat as claimed in claim 1, wherein the sliding frame has a first slider slidably attached to an inside of the base frame, a second slider oppositely located relative to the first slider and slidably attached to the inside of the base frame and a connection rod securely connected to the first slider and the second slider and having the driver securely attached thereto such that the connection rod, the first slider and the second slider are moved relative to the base frame due to the driver.

3. The foldable car seat as claimed in claim 2, wherein a pad frame is sandwiched between the first slider and the base frame and between the second slider and the base frame and has a flange formed thereon to avoid excessive friction therebetween.

4. The foldable care seat as claimed in claim 2, wherein the base frame includes a first side plate, a second side plate disposed opposite to the first side plate, and a connection rod disposed between the first side plate and the second side plate to fix locations of the first side plate and the second side plate,
    a bore is defined through the side face of the first side plate and of the second side plate to movably accommodate therein at least a stop which is firmly attached to a side face of the first slider and of the second slider to limit the range of motion of the first slider and the second slider.

5. The foldable car seat as claimed in claim 4, wherein the lower support frame comprises a first support frame foldably connected to a distal end of the first side plate and a second support frame oppositely located relative to the first support frame and foldably connected to a distal end of the second side plate, the first folding device is sandwiched between the first support frame and the distal end of the first side plate and between the second support frame and the distal end of the second side plate so that both the first support fame and the second support frame are able to fold simultaneously relative to the base frame due to the connection rod.

6. The foldable car seat as claimed in claim 5 further comprising a driving rod firmly connecting the first support frame to the second support frame to allow the first support frame along with the second support frame to pivot relative to the base frame.

7. The foldable car seat as claimed in claim 5, wherein the upper support frame comprises a third support frame foldably connected to the first support frame and a fourth support frame foldably connected to the second support frame, wherein the second folding device is sandwiched between the first support frame and the third support frame and between the second support frame and the fourth support frame to respectively allow the third support frame to fold relative to the first support frame and the fourth support frame to fold relative to the second frame, wherein the third support frame and the fourth support frame are selectively positioned between a first position where the third support frame and the fourth support frame are parallel relative to the first support frame and the second support frame and a second position where the third support frame and the fourth support frame are vertical relative to the first support frame and the second support frame, wherein the second folding device includes a joint respectively inserted between the first support frame and the third support frame and between the second support frame and the fourth support frame to allow the third support frame to pivot relative to the first support frame and to allow the fourth support frame to pivot relative to the second support frame and a first spring having a first end securely rested in a free end of the joint and a second end securely attached to a side face of the first support frame so that when the third support frame and the fourth support frame are parallel relative to the first support frame and the second support frame, the first spring is tension free and when the third support frame and the fourth support frame are vertical relative to the first support frame and the second support frame, the first spring is tensioned.

8. The foldable car seat as claimed in claim 7, wherein the second folding device further has a first cutout defined in a top periphery of the first support frame and of the second support frame and a second cutout defined in a side periphery of the first support frame and of the second support frame and a limit selectively located in the first cutout and the second cutout to respectively position the third support frame as well as the fourth support frame to be parallel or vertical relative to the first support frame and the second support frame, wherein the second folding device further comprises a second spring having a first end securely respectively attached to an inner side face of the third support frame and of the fourth support frame and a second end securely attached to the limit to allow the limit to be retracted after the limit is moved.

9. The foldable car seat as claimed in claim 2, wherein the first side plate is made of a material selected from the group consisting of steel or iron having a bending stress larger than 200 Mpa, a nylon material with or larger than 25% fiber glass, Polyamide (PA)+Acrylonitrile Butadiene Styrene (ABS) compound material, a carbonated fiber material, an alloy of aluminum and magnesium, a titanium alloy and a magnesium alloy.

* * * * *